(12) United States Patent
Mei et al.

(10) Patent No.: US 12,677,735 B2
(45) Date of Patent: Jul. 14, 2026

(54) ROBOTIC LAWN MOWER

(71) Applicant: Nanjing Chervon Industry Co., Ltd., Nanjing (CN)

(72) Inventors: Qingxiao Mei, Nanjing (CN); Weipeng Chen, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 728 days.

(21) Appl. No.: 17/980,190

(22) Filed: Nov. 3, 2022

(65) Prior Publication Data

US 2023/0059610 A1 Feb. 23, 2023

Related U.S. Application Data

(63) Continuation of application No. PCT/CN2021/100760, filed on Jun. 18, 2021.

(30) Foreign Application Priority Data

Jun. 18, 2020 (CN) .......................... 202010558974.7
Jun. 18, 2020 (CN) .......................... 202010559893.9

(51) Int. Cl.
*A01D 34/00* (2006.01)
*A01D 101/00* (2006.01)

(52) U.S. Cl.
CPC ........ *A01D 34/008* (2013.01); *A01D 2101/00* (2013.01)

(58) Field of Classification Search
CPC .. A01D 34/008; A01D 2101/00; A01D 75/28; A01D 69/02; G01C 21/3453;
(Continued)

(56) References Cited

U.S. PATENT DOCUMENTS

2006/0225928 A1 10/2006 Nelson
2008/0154429 A1* 6/2008 Lee ...................... G05D 1/0272
(Continued)

FOREIGN PATENT DOCUMENTS

CN 103744425 A 4/2014
CN 103914067 A 7/2014
(Continued)

OTHER PUBLICATIONS

Machine Translation of CN-102880175-A (Year: 2013).*
(Continued)

*Primary Examiner* — Ellis B. Ramirez
(74) *Attorney, Agent, or Firm* — Greenberg Traurig, LLP

(57) ABSTRACT

A robotic lawn mower includes a mowing element, a body, a drive assembly, a first detection module, a second detection module, a failure determination module, an execution module, and a control module. The first detection module detects a first journey of the robotic lawn mower in a period. The second detection module detects a motion parameter of the drive assembly in the period and calculates a second journey of the robotic lawn mower in the period. The failure determination module determines whether a difference between the second journey and the first journey is greater than or equal to a first preset value. The execution module drives the robotic lawn mower to execute a response program. When the difference is greater than or equal to the first preset value in each of n1 consecutive periods, the control module controls the execution module to execute the response program.

10 Claims, 9 Drawing Sheets

(58) Field of Classification Search

CPC .... G05D 1/0272; G05D 1/027; G05D 1/0214; G05D 1/0223; G05D 1/0274; G05D 1/028; G05D 1/246; G05D 1/247; G05D 1/617; G05D 1/65; G05D 1/646; G05D 1/43; G05D 1/69; G05D 2109/10; B60W 30/143

USPC ...... 701/50, 29.3, 31.4, 32.7, 34.4; 700/245; 172/2, 4.5

See application file for complete search history.

(56) References Cited

U.S. PATENT DOCUMENTS

| | | | |
|---|---|---|---|
| 2012/0219207 A1* | 8/2012 | Shin | B25J 9/1697 |
| 2019/0230850 A1* | 8/2019 | Johnson | G05D 1/0287 |
| 2019/0265725 A1* | 8/2019 | Shao | G05D 1/0278 |
| 2020/0275816 A1* | 9/2020 | Li | A47L 11/4011 |
| 2021/0064043 A1* | 3/2021 | Kulkarni | G05D 1/028 |
| 2021/0112708 A1* | 4/2021 | Kameyama | G05D 1/0088 |
| 2021/0368674 A1* | 12/2021 | Eliasson | G05D 1/0274 |
| 2023/0034100 A1* | 2/2023 | Holgersson | A01D 34/008 |

FOREIGN PATENT DOCUMENTS

| | | | | | |
|---|---|---|---|---|---|
| CN | 104699101 | A | 6/2015 | | |
| CN | 102880175 | A | 2/2016 | | |
| CN | 105867379 | A | 8/2016 | | |
| CN | 206491007 | U | 9/2017 | | |
| CN | 107402573 | A | 11/2017 | | |
| CN | 107509443 | A | 12/2017 | | |
| CN | 104778111 | B | 3/2019 | | |
| CN | 109634285 | A | 4/2019 | | |
| CN | 107643186 | B | 7/2019 | | |
| CN | 109514581 | A | 3/2021 | | |
| EP | 1488296 | B1 * | 4/2006 | ............ | B60K 31/04 |
| EP | 3402036 | A1 | 5/2024 | | |
| IN | 103744425 | A | 4/2014 | | |
| JP | H06127386 | A | 5/1994 | | |
| JP | 2007323119 | A * | 12/2007 | | |
| JP | 2019187432 | A | 10/2019 | | |
| KR | 100645816 | B1 | 11/2006 | | |
| WO | 2019052285 | A1 | 3/2019 | | |
| WO | 2022133203 | A1 | 6/2022 | | |

OTHER PUBLICATIONS

ISA/CN, Int. Search Report issued on PCT application No. PCT/CN2021/100760, dated Sep. 26, 2021, 5 pages.

ISA/CN, English translation of Int. Search Report issued on PCT application No. PCT/CN2021/100760, dated Sep. 26, 2021, 3 pages.

ISA/CN, Written Opinion issued on PCT application No. PCT/CN2021/100760, dated Sep. 26, 2021, 3 pages.

ISA/CN, English translation of Written Opinion issued on PCT application No. PCT/CN2021/100760, dated Sep. 26, 2021, 3 pages.

Office Action from EP application No. 2186309.3, dated May 13, 2024, 5 pp.

* cited by examiner

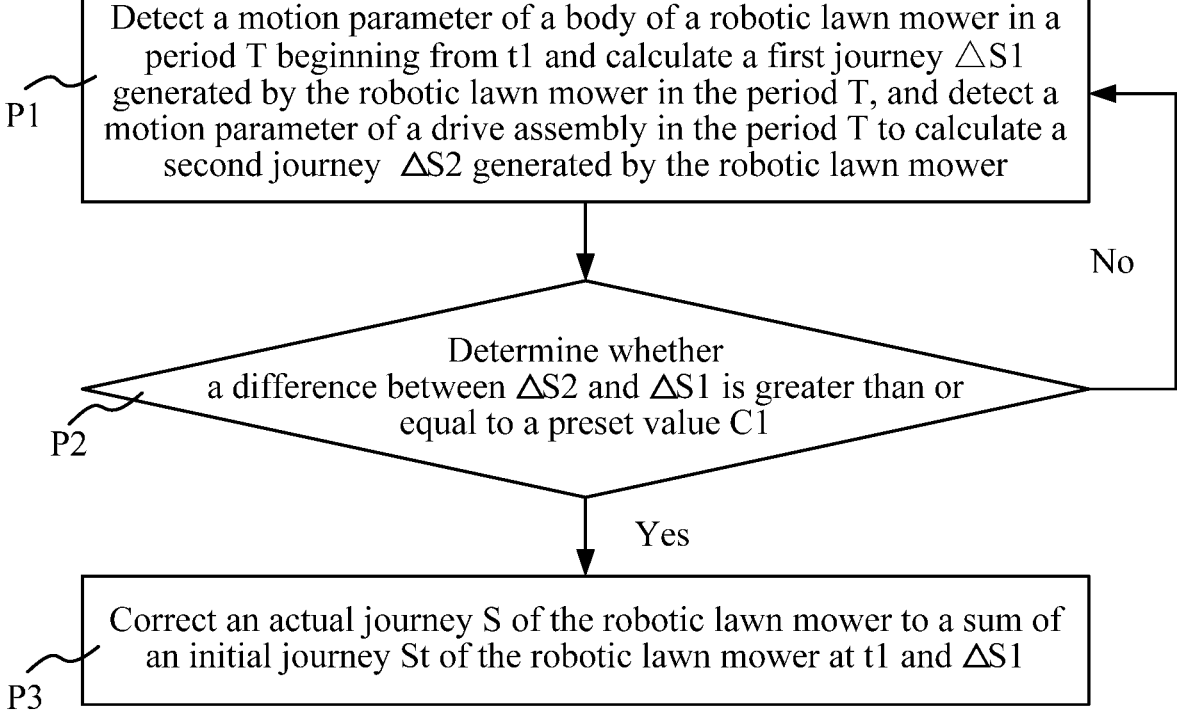

P1    Detect a motion parameter of a body of a robotic lawn mower in a period T beginning from t1 and calculate a first journey $\triangle S1$ generated by the robotic lawn mower in the period T, and detect a motion parameter of a drive assembly in the period T to calculate a second journey $\triangle S2$ generated by the robotic lawn mower No P2    Determine whether a difference between $\triangle S2$ and $\triangle S1$ is greater than or equal to a preset value C1

Yes

P3    Correct an actual journey S of the robotic lawn mower to a sum of an initial journey St of the robotic lawn mower at t1 and $\triangle S1$

FIG. 4

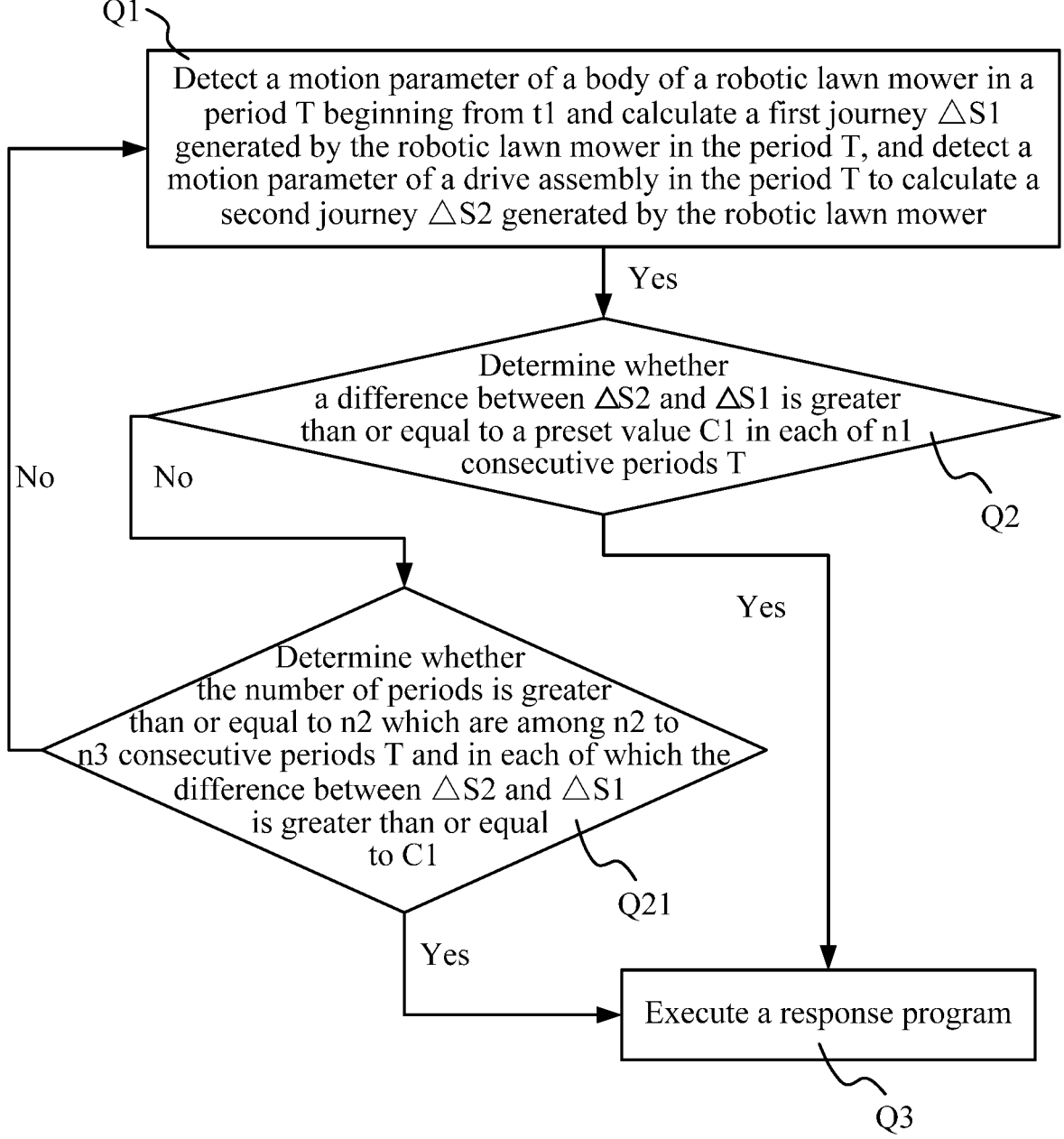

Q1

Detect a motion parameter of a body of a robotic lawn mower in a period T beginning from t1 and calculate a first journey △S1 generated by the robotic lawn mower in the period T, and detect a motion parameter of a drive assembly in the period T to calculate a second journey △S2 generated by the robotic lawn mower Yes Determine whether a difference between △S2 and △S1 is greater than or equal to a preset value C1 in each of n1 consecutive periods T

Q2

No          No

Determine whether the number of periods is greater than or equal to n2 which are among n2 to n3 consecutive periods T and in each of which the difference between △S2 and △S1 is greater than or equal to C1

Q21

Yes

Yes

Execute a response program

ROBOTIC LAWN MOWER

RELATED APPLICATION INFORMATION

This application is a continuation of International Application Number PCT/CN2021/100760, filed on Jun. 18, 2021, through which this application also claims the benefit under 35 U.S.C. § 119(a) of Chinese Patent Application No. CN 202010558974.7, filed on Jun. 18, 2020, and Chinese Patent Application No. CN 202010559893.9, filed on Jun. 18, 2020, which applications are incorporated herein by reference in their entireties.

BACKGROUND

When a robotic lawn mower walks on the ground, it is very likely that the robotic lawn mower slips due to the unevenness of the ground or the moisture of the ground. In this case, if a response action is not performed on the robotic lawn mower in time, the robotic lawn mower will be in a slip state all the time, which reduces the working efficiency of the robotic lawn mower. Similarly, when the robotic lawn mower walks on a slope with a certain gradient, the robotic lawn mower is liable to skid or slide on the slope. In this case, if a response action is not performed on the robotic lawn mower in time, the robotic lawn mower will be in a skid or slide state for a long time, which also reduces the working efficiency of the robotic lawn mower.

SUMMARY

An example provides a robotic lawn mower including a mowing element, a body, a drive assembly, a first detection module, a second detection module, a failure determination module, an execution module, and a control module. The body is used for supporting the mowing element. The drive assembly includes walking wheels supporting the body to drive the body to walk on the ground and a motor connected to the walking wheels to drive the walking wheels to rotate. The first detection module detects a motion parameter of the body of the robotic lawn mower in a period and calculates a first journey of the robotic lawn mower in the period. The second detection module detects a motion parameter of the drive assembly in the period and calculates a second journey of the robotic lawn mower in the period. The failure determination module determines whether a difference between the second journey and the first journey is greater than or equal to a first preset value. The execution module drives the robotic lawn mower to execute a response program. The control module is separately connected to the failure determination module and the execution module. When the difference between the second journey and the first journey is greater than or equal to the first preset value in each of n1 consecutive periods, the control module controls the execution module to execute the response program.

In an example, in response of a number of periods in each of which the difference between the second journey and the first journey is greater than or equal to the first preset value is greater than or equal to n2 in a consecutive plurality of periods among n2 to n3, the control module controls the execution module to execute the response program.

In an example, the execution module includes an alarm module configured to send an alarm signal to a user.

In an example, the execution module includes a failure avoidance module configured to control the robotic lawn mower to perform an action response.

In an example, the robotic lawn mower further includes a setting module connected to the failure determination module and configured to set a size of the first preset value.

In an example, the failure determination module further determines whether a difference between the first journey and the second journey is greater than or equal to a second preset value; where when the difference between the first journey and the second journey is greater than or equal to the second preset value in each of k1 consecutive periods, the control module controls the execution module to execute the response program.

In an example, the failure determination module further determines whether a difference between the first journey and the second journey is greater than or equal to a second preset value; where in response to a number of periods in each of which the difference between the first journey and the second journey is greater than or equal to the second preset value is greater than or equal to k2 in a consecutive plurality of periods among k2 to k3, the control module controls the execution module to execute the response program.

An example provides a robotic lawn mower including a mowing element, a body, a drive assembly, a first detection module, a second detection module, a failure determination module, an execution module, and a control module. The body is used for supporting the mowing element. The drive assembly includes walking wheels supporting the body to drive the body to walk on the ground and a motor connected to the walking wheels to drive the walking wheels to rotate. The first detection module detects a motion parameter of the body of the robotic lawn mower in a period and calculates a first journey of the robotic lawn mower in the period. The second detection module detects a motion parameter of the drive assembly in the period and calculates a second journey of the robotic lawn mower in the period. The failure determination module determines whether a difference between the second journey and the first journey is greater than or equal to a preset value. The execution module drives the robotic lawn mower to execute a response program. The control module is separately connected to the failure determination module and the execution module. When a number of periods in each of which the difference between the second journey and the first journey is greater than or equal to the preset value is greater than or equal to n1 in a consecutive plurality of periods among n1 to n2, the control module controls the execution module to execute the response program.

An example provides a robotic lawn mower including a mowing element, a body, a drive assembly, a first detection module, a second detection module, a failure determination module, an execution module, and a control module. The body is used for supporting the mowing element. The drive assembly includes walking wheels supporting the body to drive the body to walk on the ground and a motor connected to the walking wheels to drive the walking wheels to rotate. The first detection module detects a motion parameter of the body of the robotic lawn mower in a period and calculates a first journey of the robotic lawn mower in the period. The second detection module detects a motion parameter of the drive assembly in the period and calculates a second journey of the robotic lawn mower in the period. The failure determination module determines whether a difference between the first journey and the second journey is greater than or equal to a preset value. The execution module drives the robotic lawn mower to execute a response program. The control module is separately connected to the failure determination module and the execution module. When the difference between the first journey and the second journey is greater than or equal to the preset value in each of k1 consecutive periods, the control module controls the execution module to execute the response program.

An example provides a robotic lawn mower including a mowing element, a body, a drive assembly, a first detection module, a second detection module, a failure determination module, an execution module, and a control module. The body is used for supporting the mowing element. The drive assembly includes walking wheels supporting the body to drive the body to walk on the ground and a motor connected to the walking wheels to drive the walking wheels to rotate. The first detection module detects a motion parameter of the body of the robotic lawn mower in a period and calculates a first journey of the robotic lawn mower in the period. The second detection module detects a motion parameter of the drive assembly in the period and calculates a second journey of the robotic lawn mower in the period.

The failure determination module determines whether a difference between the first journey and the second journey is greater than or equal to a preset value.

The execution module drives the robotic lawn mower to execute a response program.

The control module is separately connected to the failure determination module and the execution module.

When a number of periods in each of which the difference between the first journey and the second journey is greater than or equal to the preset value is greater than or equal to k1 in a consecutive plurality of periods among k1 to k2, the control module controls the execution module to execute the response program.

An example provides a control method of a robotic lawn mower, where the robotic lawn mower includes a body and a drive assembly which includes walking wheels supporting the body to drive the body to walk on the ground and a motor connected to the walking wheels to drive the walking wheels to rotate and the control method includes: detecting a motion parameter of the body of the robotic lawn mower in a period and calculating a first journey of the robotic lawn mower in the period, and detecting a motion parameter of the drive assembly in the period and calculating a second journey of the robotic lawn mower in the period; determining whether a difference between the second journey and the first journey is greater than or equal to a preset value in each of n1 consecutive periods; and when the difference between the second journey and the first journey is greater than or equal to the preset value in each of the n1 consecutive periods, controlling the robotic lawn mower to execute a response program.

An example provides a control method of a robotic lawn mower, where the robotic lawn mower includes a body and a drive assembly which includes walking wheels supporting the body to drive the body to walk on the ground and a motor connected to the walking wheels to drive the walking wheels to rotate and the control method includes: detecting a motion parameter of the body of the robotic lawn mower in a period and calculating a first journey of the robotic lawn mower in the period, and detecting a motion parameter of the drive assembly in the period and calculating a second journey of the robotic lawn mower in the period; determining whether a number of periods in each of which a difference between the second journey and the first journey is greater than or equal to a preset value is greater than or equal to n1 in a consecutive plurality of periods among n1 to n2; and when the number of periods in each of which the difference between the second journey and the first journey is greater than or equal to the preset value is greater than or equal to n1 in the consecutive plurality of periods among the n1 to n2, controlling the robotic lawn mower to execute a response program, controlling the robotic lawn mower to execute a response program.

An example provides a control method of a robotic lawn mower, where the robotic lawn mower includes a body and a drive assembly which includes walking wheels supporting the body to drive the body to walk on the ground and a motor connected to the walking wheels to drive the walking wheels to rotate and the control method includes: detecting a motion parameter of the body of the robotic lawn mower in a period and calculating a first journey of the robotic lawn mower in the period, and detecting a motion parameter of the drive assembly in the period and calculating a second journey of the robotic lawn mower in the period; determining whether a difference between the first journey and the second journey is greater than or equal to a preset value in each of k1 consecutive periods; and when the difference between the first journey and the second journey is greater than or equal to the preset value in each of the k1 consecutive periods, controlling the robotic lawn mower to execute a response program.

An example provides a control method of a robotic lawn mower, where the robotic lawn mower includes a body and a drive assembly which includes walking wheels supporting the body to drive the body to walk on the ground and a motor connected to the walking wheels to drive the walking wheels to rotate and the control method includes: detecting a motion parameter of the body of the robotic lawn mower in a period and calculating a first journey of the robotic lawn mower in the period, and detecting a motion parameter of the drive assembly in the period and calculating a second journey of the robotic lawn mower in the period; determining whether a number of periods in each of which a difference between the first journey and the second journey is greater than or equal to a preset value is greater than or equal to k1 in a consecutive plurality of periods among k1 to k2; and when the number of periods in each of which the difference between the first journey and the second journey is greater than or equal to the preset value is greater than or equal to k1 in the consecutive plurality of periods among the k1 to k2, controlling the robotic lawn mower to execute a response program.

An example provides a robotic lawn mower including a mowing element, a body, a drive assembly, a first detection module, a second detection module, a failure determination module, a correction module, and a control module. The body is used for supporting the mowing element. The drive assembly includes walking wheels supporting the body to drive the body to walk on the ground and a motor connected to the walking wheels to drive the walking wheels to rotate. The first detection module detects a motion parameter of the body of the robotic lawn mower in a period and calculates a first journey of the robotic lawn mower in the period. The second detection module detects a motion parameter of the drive assembly in the period and calculates a second journey of the robotic lawn mower in the period. The failure determination module determines whether a difference between the second journey and the first journey is greater than or equal to a first preset value. The correction module corrects an actual distance of the robotic lawn mower. The control module is separately connected to the failure determination module and the correction module. When the difference between the second journey and the first journey is greater than or equal to the first preset value, the control module controls the correction module to correct the actual distance of the robotic lawn mower to a sum of an initial distance at the beginning of the period and the first journey.

In an example, the period is greater than or equal to 1 millisecond and less than or equal to 100 milliseconds.

In an example, when the body of the robotic lawn mower has a first traveling speed, the first preset value is a first value; and when the body of the robotic lawn mower has a second traveling speed, the first preset value is a second value; where when the first traveling speed is higher than the second traveling speed, the first value is greater than the second value.

In an example, a first preset value when the first journey of the robotic lawn mower in the period is a first value is greater than a first preset value when the first journey of the robotic lawn mower in the period is a second value, where the first value is greater than the second value.

In an example, the robotic lawn mower further includes a setting module connected to the failure determination module and configured to set a size of the first preset value.

In an example, when the difference between the second journey and the first journey is greater than or equal to the first preset value in each of the first number of consecutive periods, the setting module increases the size of the first preset value.

In an example, when the difference between the second journey and the first journey is greater than or equal to the first preset value in each of the first number of consecutive periods, the setting module sets that the size of the first preset value changes with the first number.

In an example, the failure determination module further determines whether a difference between the first journey and the second journey is greater than or equal to a second preset value; and when the difference between the first journey and the second journey is greater than or equal to the second preset value, the control module controls the correction module to correct the actual distance of the robotic lawn mower to the sum of the initial distance at the beginning of the period and the first journey.

An example provides a robotic lawn mower including a mowing element, a body, a drive assembly, a first detection module, a second detection module, a failure determination module, a correction module, and a control module. The body is used for supporting the mowing element. The drive assembly includes walking wheels supporting the body to drive the body to walk on the ground and a motor connected to the walking wheels to drive the walking wheels to rotate. The first detection module detects a motion parameter of the body of the robotic lawn mower in a period and calculates a first journey of the robotic lawn mower in the period. The second detection module detects a motion parameter of the drive assembly in the period and calculates a second journey of the robotic lawn mower in the period. The failure determination module determines whether a difference between the first journey and the second journey is greater than or equal to a preset value. The correction module corrects an actual distance of the robotic lawn mower. The control module is separately connected to the failure determination module and the correction module. When the difference between the first journey and the second journey is greater than or equal to the preset value, the control module controls the correction module to correct the actual distance of the robotic lawn mower to a sum of an initial distance at the beginning of the period and the first journey.

An example provides a method for correcting a distance of a robotic lawn mower, where the robotic lawn mower includes a body and a drive assembly which includes walking wheels supporting the body to drive the body to walk on the ground and a motor connected to the walking wheels to drive the walking wheels to rotate and the method includes: detecting a motion parameter of the body of the robotic lawn mower in a period and calculating a first journey of the robotic lawn mower in the period, and detecting a motion parameter of the drive assembly in the period to calculate a second journey of the robotic lawn mower in the period; determining whether a difference between the second journey and the first journey is greater than or equal to a first preset value; and when the difference between the second journey and the first journey is greater than or equal to the first preset value, correcting an actual distance of the robotic lawn mower to a sum of an initial distance at the beginning of the period and the first journey.

In an example, the method further includes: setting a size of the first preset value according to a change of a motion parameter of the robotic lawn mower.

In an example, the method further includes: determining whether a difference between the first journey and the second journey is greater than or equal to a second preset value; and when the difference between the first journey and the second journey is greater than or equal to the second preset value, correcting the actual distance of the robotic lawn mower to the sum of the initial distance at the beginning of the period and the first journey.

An example provides a method for correcting a distance of a robotic lawn mower, where the robotic lawn mower includes a body and a drive assembly which includes walking wheels supporting the body to drive the body to walk on the ground and a motor connected to the walking wheels to drive the walking wheels to rotate and the method includes: detecting a motion parameter of the body of the robotic lawn mower in a period and calculating a first journey of the robotic lawn mower in the period, and detecting a motion parameter of the drive assembly in the period and calculating a second journey of the robotic lawn mower in the period; determining whether a difference between the first journey and the second journey is greater than or equal to a preset value; and when the difference between the first journey and the second journey is greater than or equal to the preset value, correcting an actual distance of the robotic lawn mower to a sum of an initial distance at the beginning of the period and the first journey.

BRIEF DESCRIPTION OF DRAWINGS

FIG. 4 is a flowchart of a method for correcting a distance of the robotic lawn mower in FIG. 1;

FIG. 7 is a flowchart of another method for determining a slip of the robotic lawn mower in FIG. 1;

DETAILED DESCRIPTION

Figure 1:
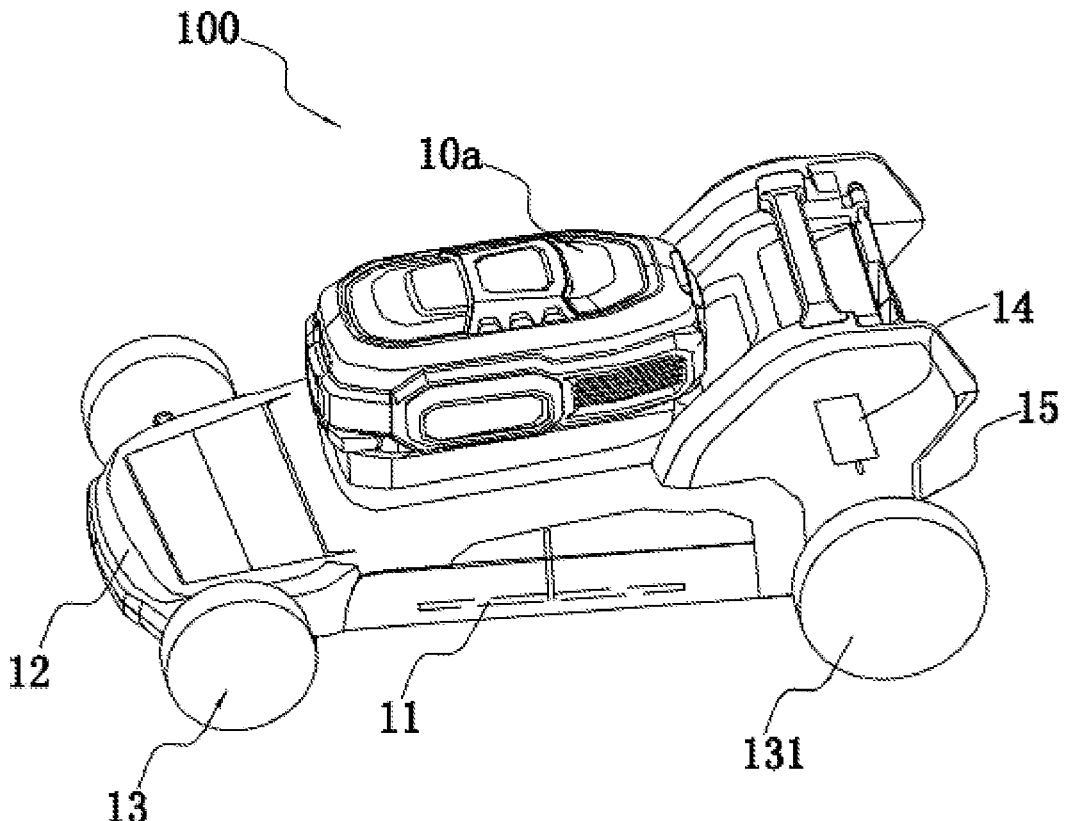
FIG. 1 is a perspective view of a robotic lawn mower according to an example.

A robotic lawn mower 100 shown in FIG. 1, as an outdoor walking power tool, is typically used for trimming vegetation such as lawns and weeds outdoors. The robotic lawn mower 100 can automatically walk outdoors without a user pushing it by hand, and the robotic lawn mower 100 can automatically trim a lawn according to its own control system or a user-side control system.

Figure 2:
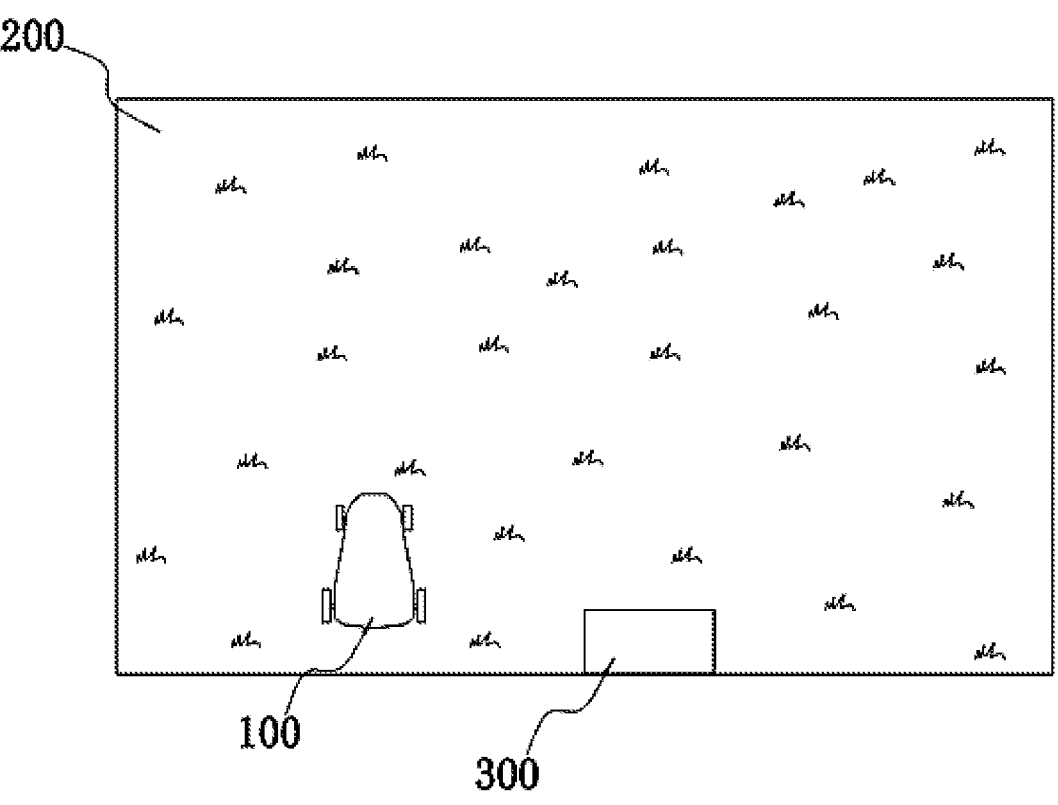
FIG. 2 is a plan view showing that the robotic lawn mower in FIG. 1 travels in a boundary area.

As shown in FIG. 2, the robotic lawn mower 100 may walk within a boundary area 200 provided outdoors to cut the vegetation. The boundary of the boundary area 200 may be cables which surround the boundary area 200. Alternatively, the boundary may also be a virtual boundary on a map, and the virtual boundary surrounds a virtual boundary area 200. A charging pile 300 for charging the robotic lawn mower 100 is provided in the boundary area 200 or on the boundary, and when the robotic lawn mower 100 has insufficient power, the robotic lawn mower 100 automatically walks to the charging pile 300 to be charged.

As shown in FIG. 1, the robotic lawn mower 100 includes a mowing element 11, a housing 12, a walking assembly 13, a first motor 14, and a second motor. The mowing element 11 is used for cutting grass on the ground. The housing 12 is used for supporting the mowing element 11, the walking assembly 13, the first motor 14, and the second motor. The walking assembly 13 includes first walking wheels 131 connected to the first motor 14, and the first motor 14 drives the first walking wheels 131 to rotate. The walking assembly 13 further includes second walking wheels mounted on the front side of the housing 12, and the second walking wheels are not connected to the first motor 14. That is to say, the first motor 14 drives only the first walking wheels 131 to rotate, and the second walking wheels assist in support and walking. In other examples, the robotic lawn mower 100 may include multiple first motors 14 which drive the first walking wheels 131 and the second walking wheels, separately. The second motor is used for driving the mowing element 11 to rotate to implement a mowing function. In other examples, the robotic lawn mower 100 may include only one motor which drives the walking assembly 13 and the mowing element 11. In this example, the whole constituted by the first walking wheels 131 and the first motor 14 for driving the first walking wheels 131 is considered as a drive assembly 15 for driving the robotic lawn mower 100 to walk on the ground.

Figure 3:
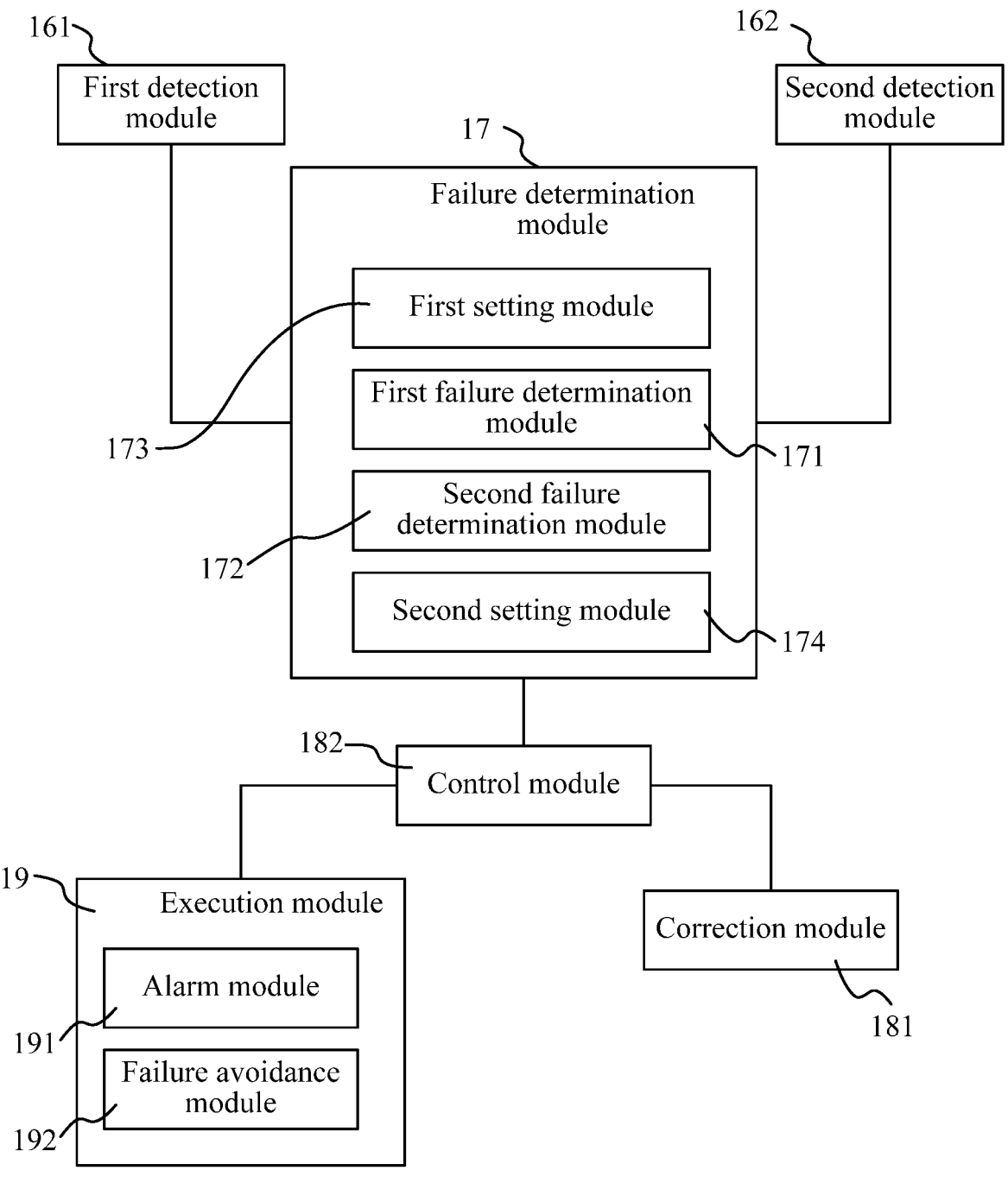
FIG. 3 is a structure diagram of modules of the robotic lawn mower in FIG. 1.

As shown in FIG. 3, the robotic lawn mower 100 further includes a first detection module 161 and a second detection module 162, where the first detection module 161 is configured to detect a motion parameter of a body 10a of the robotic lawn mower 100 in a period T and calculate a first journey ΔS1 of the robotic lawn mower 100 in the period T, and the second detection module 162 is configured to detect a motion parameter of the drive assembly 15 in the period T and calculate a second journey ΔS2 of the robotic lawn mower 100 in the period T. The body 10a of the robotic lawn mower 100 may be understood as a motion parameter of the whole robotic lawn mower. During detection, the first detection module 161 may obtain the motion parameter of the body 10a of the robotic lawn mower 100 by detecting a motion parameter of the housing 12, or the first detection module 161 may obtain the motion parameter of the body 10a of the robotic lawn mower 100 by detecting a motion parameter of another part which moves forward or backward synchronously with the housing 12. For example, the motion parameter of the body 10a may be an acceleration of the body 10a, a posture of the body 10a, or the like, and the first journey ΔS1 which the body 10a moves is finally calculated. In an example, in a relatively short period T, the first journey ΔS1 calculated through the detection of the motion parameter of the body 10a is substantially the same as an actual distance which the robotic lawn mower 100 moves in this period. The second detection module 162 may calculate the second journey ΔS2 of the robotic lawn mower 100 by detecting a motion parameter of the first motor 14, or the second detection module 162 may calculate the second journey ΔS2 of the robotic lawn mower 100 by detecting a motion parameter of the first walking wheels 131.

When the robotic lawn mower 100 normally travels on the ground, the first journey ΔS1 and the second journey ΔS2 are substantially the same in the relatively short period T. In this case, the actual distance of the robotic lawn mower 100 may be calculated through the first journey ΔS1 or the second journey ΔS2. However, if a slip or a skid or slide on a slope occurs when the robotic lawn mower 100 travels on the ground, the first journey ΔS1 and the second journey ΔS2 of the robotic lawn mower 100 in the period T are different. The slip refers to the case where the first walking wheels 131 are driven by the first motor 14 to normally rotate while the robotic lawn mower 100 stops walking, or a distance which the robotic lawn mower 100 walks is less than a distance which the robotic lawn mower 100 driven by the first walking wheels 131 should walk, that is, the first walking wheels 131 idle. When the robotic lawn mower 100 walks outdoors, a raised obstacle on the ground may cause the first walking wheels 131 to idle if the robotic lawn mower 100 walks on the uneven ground. Thus, the robotic lawn mower 100 is liable to slip at this time. Alternatively, when the robotic lawn mower 100 walks on the wet ground, the friction force between the ground and the walking assembly 13 is relatively small and the first walking wheels 131 are also liable to idle in this case. Thus, the robotic lawn mower 100 also slips at this time. When the robotic lawn mower 100 is on the ground with a certain gradient, for example, the ground is also relatively wet, if the body 10a moves but the first walking wheels 131 do not rotate, it may be determined that the robotic lawn mower 100 may slide or skid on a slope.

In this example, the robotic lawn mower 100 further includes a failure determination module 17, a correction module 181, a control module 182, and an execution module 19. The failure determination module 17 is connected to the first detection module 161 and further connected to the second detection module 162. The failure determination module 17 can determine whether a difference between the second journey ΔS2 and the first journey ΔS1 is greater than or equal to a first preset value C 1. The correction module 181 is configured to correct the actual distance of the robotic lawn mower 100. The control module 182 is connected to the failure determination module 17 and further connected to the execution module 19. When the difference between the second journey ΔS2 and the first journey ΔS1 is greater than or equal to the first preset value C1, the control module 182 controls the correction module 181 to correct the actual distance of the robotic lawn mower 100 to a sum of an initial distance at the beginning of the period T and the first journey ΔS1. Optionally, the failure determination module 17 includes a first failure determination module 171 which is mainly configured to determine the problem where the robotic lawn mower 100 may slip.

When the robotic lawn mower 100 slips, the first journey ΔS1 more approximates to the actual distance which the robotic lawn mower 100 moves in the period T, and the second journey ΔS2 is greater than the actual distance of the robotic lawn mower 100. Therefore, the actual distance of the robotic lawn mower 100 is corrected to the sum of the initial distance at the beginning of the period T and the first journey ΔS1 so that the distance of the robotic lawn mower 100 can be calculated more accurately. Moreover, in this example, both the first journey ΔS1 and the second journey ΔS2 are detected in a certain period T. The period T is set so that the robotic lawn mower 100 can cyclically correct the distance, thereby calculating a real-time distance of the robotic lawn mower 100 more accurately. In addition, even if the robotic lawn mower 100 travels normally on the ground, limited by the detection accuracy of the first detection module 161, the first journey ΔS1 cannot be exactly the same as the actual distance of the robotic lawn mower 100, and similarly, limited by the detection accuracy of the second detection module 162, the second journey ΔS2 cannot be exactly the same as the actual distance of the robotic lawn mower 100. Therefore, a failure determination condition is set to be whether the difference between the second journey ΔS2 and the first journey ΔS1 is greater than or equal to the first preset value C1 which is greater than 0 so that the robotic lawn mower 100 can be prevented from the case where the actual distance of the robotic lawn mower 100 is corrected not accurately enough.

The failure determination module 17 further includes a second failure determination module 172. The second failure determination module 172 is connected to the first detection module 161 and the second detection module 162. The second failure determination module 172 is configured to determine whether a difference between the first journey ΔS1 and the second journey ΔS2 is greater than or equal to a second preset value C2. When the difference between the first journey ΔS1 and the second journey ΔS2 is greater than or equal to the second preset value C2, the control module 182 controls the correction module 181 to correct the actual distance of the robotic lawn mower 100 to the sum of the initial distance at the beginning of the period T and the first journey ΔS1.

In an example, when the robotic lawn mower 100 skids or slides on a slope, the first journey ΔS1 more approximates to the actual distance which the robotic lawn mower 100 moves in the period T, and the second journey ΔS2 is less than the actual distance of the robotic lawn mower 100. Therefore, the actual distance of the robotic lawn mower 100 is corrected to the sum of the initial distance at the beginning of the period T and the first journey ΔS1 so that the distance of the robotic lawn mower 100 can be calculated more accurately. Moreover, in this example, both the first journey ΔS1 and the second journey ΔS2 are detected in the certain period T. The period T is set so that the robotic lawn mower 100 can cyclically correct the distance, thereby calculating the real-time distance of the robotic lawn mower 100 more accurately. In addition, even if the robotic lawn mower 100 travels normally on the ground, limited by the detection accuracy of the first detection module 161, the first journey ΔS1 cannot be exactly the same as the actual distance of the robotic lawn mower 100, and similarly, limited by the detection accuracy of the second detection module 162, the second journey ΔS2 cannot be exactly the same as the actual distance of the robotic lawn mower 100. Therefore, a failure determination condition is set to be whether the difference between the first journey ΔS1 and the second journey ΔS2 is greater than or equal to the second preset value C2 which is greater than 0 so that the robotic lawn mower 100 can be prevented from the case where the actual distance of the robotic lawn mower 100 is corrected not accurately enough.

In an example, a period Tat which the first journey ΔS1 is detected based on the slip may be different from a period T at which the first journey ΔS1 is detected based on the skid so that the actual distance of the robotic lawn mower 100 can be detected more accurately according to different working conditions of the robotic lawn mower 100. For example, in an example, the robotic lawn mower 100 includes two first detection modules 161 and two second detection modules 162, where the two first detection modules 161 can detect the motion parameter of the body 10a of the robotic lawn mower 100 in different periods T separately, and the two second detection modules 162 can also detect the motion parameter of the drive assembly 15 in the different periods T separately.

As shown in FIG. 4, a method for correcting a distance of the robotic lawn mower 100 includes the steps described below.

In P1, the motion parameter of the body 10a of the robotic lawn mower 100 in the period T is detected and the first journey ΔS1 of the robotic lawn mower 100 in the period is calculated, and the motion parameter of the drive assembly 15 in the period T is detected and the second journey ΔS2 of the robotic lawn mower 100 in the period is calculated. For example, in the period T, the first detection module 161 begins detecting the motion parameter of the body 10a of the robotic lawn mower 100 from a moment t1 when the period T begins and calculates the first journey ΔS1 generated by the robotic lawn mower 100 in the period T, where a distance which the robotic lawn mower 100 has traveled until the moment t1 is the initial distance St1, and the second detection module 162 begins detecting the motion parameter of the drive assembly 15 from the moment t1 when the period T begins and calculates the second journey ΔS2 generated by the robotic lawn mower 100 in the period T.

In P2, it is determined whether the difference between the second journey ΔS2 and the first journey ΔS1 is greater than or equal to the first preset value C1. The first failure determination module 171 receives data detected by the first detection module 161 and the second detection module 162 and then determines whether the difference between the second journey ΔS2 and the first journey ΔS1 is greater than or equal to the first preset value C1, that is, the first failure determination module 171 determines whether the following formula is satisfied:

$$\Delta S2 - \Delta S1 \geq C1. \tag{1}$$

When the difference between the second journey ΔS2 and the first journey ΔS1 is greater than or equal to the first preset value C1, the process goes to the next step. When the difference between the second journey ΔS2 and the first journey ΔS1 is less than the first preset value C1, the process returns to step P1 to continue detection.

In P3, the actual distance St2 of the robotic lawn mower 100 is corrected to the sum of the initial distance St1 at the beginning of the period T and the first journey ΔS1. When the first failure determination module 171 determines that the difference between ΔS2 and ΔS1 is greater than or equal to the first preset value C1, a determination result is sent to the control module 182, and the control module 182 controls the correction module 181 to correct the actual distance of the robotic lawn mower 100. For example, the correction module 181 corrects the actual distance St2 which the robotic lawn mower 100 travels to a moment t2 when the period T ends to the sum of the initial distance St1 at the beginning of the period T and the first journey $\Delta S1$, that is, the actual distance St2 at the moment t2 is corrected according to the following formula:

$$St2 = St1 + \Delta S1. \tag{2}$$

When the difference between the second journey $\Delta S2$ and the first journey $\Delta S1$ is less than the first preset value C1, the process returns to step P1 to continue the detection.

Figure 5:
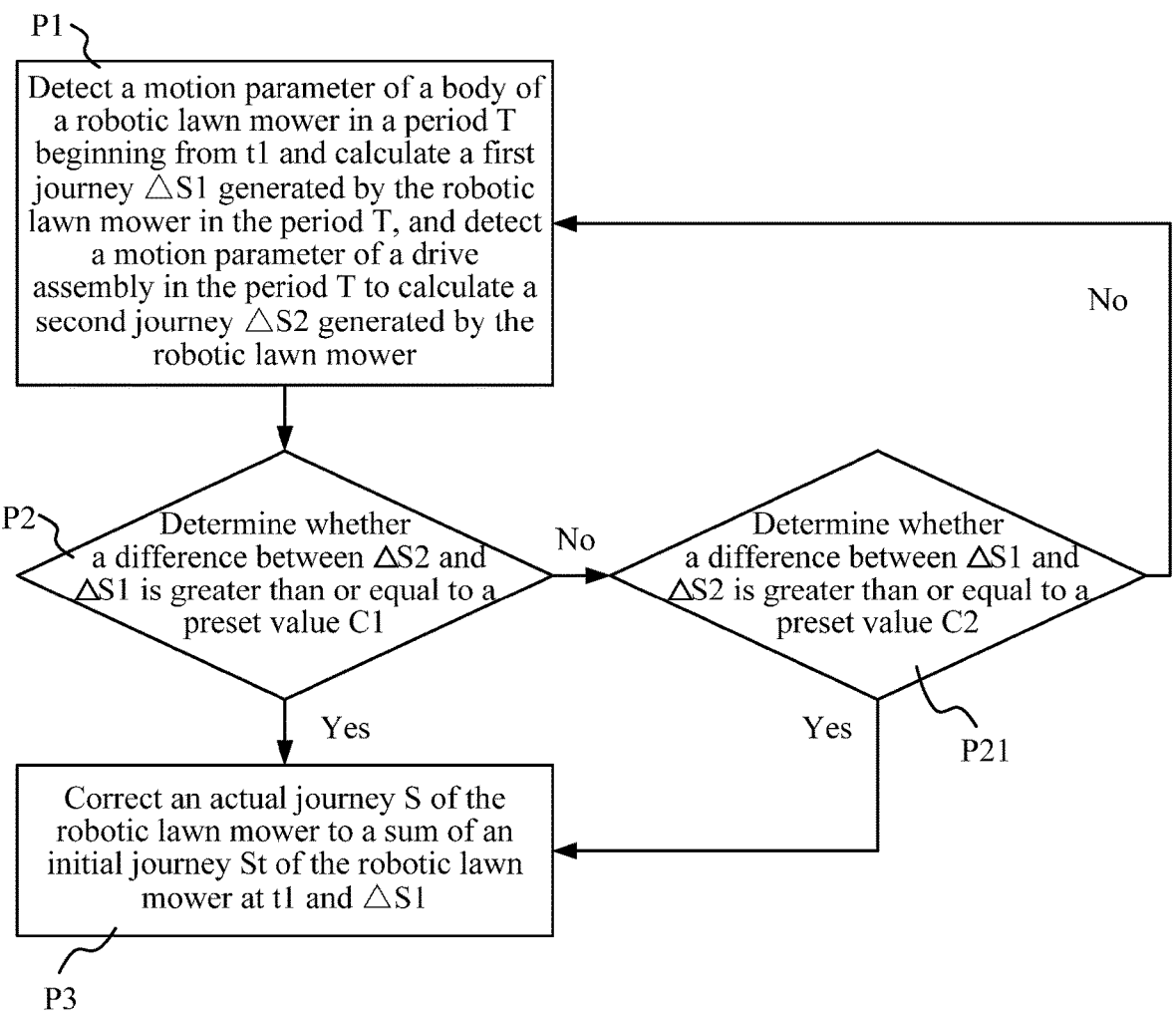
FIG. 5 is a flowchart of another method for correcting a distance of the robotic lawn mower in FIG. 1.

As shown in FIG. 5, step P21 is further included between step P2 and step P3. In P21, when the difference between the second journey $\Delta S2$ and the first journey $\Delta S1$ is less than the first preset value C1, it is determined whether the difference between the first journey $\Delta S1$ and the second journey $\Delta S2$ is greater than or equal to the second preset value C2, that is, it is determined whether the following formula is satisfied:

$$\Delta S1 - \Delta S2 \geq C2. \tag{3}$$

When the difference between the first journey $\Delta S1$ and the second journey $\Delta S2$ is greater than or equal to the second preset value C2, the process goes to step P3, and the correction module 181 corrects the actual distance St2 which the robotic lawn mower 100 travels to the moment t2 when the period T ends to the sum of the initial distance St1 at the beginning of the period T and the first journey $\Delta S1$. If the difference between the first journey $\Delta S1$ and the second journey $\Delta S2$ is less than the second preset value C2, the process returns to step P1 to continue the detection. In an example, there is no fixed sequence between step P2 and step P21. In other examples, step P21 may be performed before step P2.

When the difference between the second journey $\Delta S2$ and the first journey $\Delta S1$ is less than the first preset value C1 and the difference between the first journey $\Delta S1$ and the second journey $\Delta S2$ is less than the second preset value C2, the correction module 181 fuses the first journey $\Delta S1$ and the second journey $\Delta S2$ to obtain a fused distance $\Delta S$, and then the correction module 181 corrects the actual distance St2 of the robotic lawn mower 100 at the moment t2 to the sum of the initial distance St1 and the fused distance $\Delta S$, which is shown by the following formula:

$$\Delta S = f(\Delta S1, \Delta S2). \tag{4}$$

In this manner, the detection accuracy of the first detection module 161 and the detection accuracy of the second detection module 162 can be simultaneously considered so that the detection accuracy of the distance of the robotic lawn mower 100 can be improved.

In this example, the first detection module 161 is an inertial measurement unit, and the second detection module 162 is an odometer. When the robotic lawn mower 100 travels for a long time, the inertial measurement unit may have an inaccurate detection result with the accumulation of errors, and the detection result of the inertial measurement unit is relatively accurate in the relatively short period T. Therefore, in some other examples, when the difference between the second journey $\Delta S2$ and the first journey $\Delta S1$ is less than the first preset value C1 and the difference between the first journey $\Delta S1$ and the second journey $\Delta S2$ is less than the second preset value C2, the correction module 181 corrects the actual distance St2 of the robotic lawn mower 100 at the moment t2 to a sum of the initial distance St1 and the second journey $\Delta S2$.

In this example, the period T at which the first detection module 161 performs the detection is greater than or equal to 1 millisecond and less than or equal to 100 milliseconds. In this manner, the detection accuracy of the actual distance of the robotic lawn mower 100 can be improved. In an example, the period T is greater than or equal to 10 milliseconds and less than or equal to 50 milliseconds. On the one hand, a program error caused by too frequent detections can be avoided, and on the other hand, the detection period can be shortened so that the detection accuracy of the actual distance is improved.

A size of the first preset value C1 may be adjusted or set. In this manner, the size of the first preset value C1 may be adjusted in real time according to an actual condition of the robotic lawn mower 100 and a working condition of the robotic lawn mower 100 in operation, thereby improving the detection accuracy of the actual distance of the robotic lawn mower 100. In this example, the robotic lawn mower 100 further includes a first setting module 173 configured to set the first preset value C1. The first setting module 173 is connected to the first failure determination module 171, and the first setting module 173 can set the size of the first preset value C1 in real time. In this example, when the difference between the second journey $\Delta S2$ and the first journey $\Delta S1$ is greater than or equal to the first preset value C1 in each of a first number of consecutive periods T, an error of the actual distance corrected by the correction module 181 according to the first journey $\Delta S1$ detected by the first detection module 161 continuously increases. In this case, the first setting module 173 changes the size of the first preset value C1 according to a change of the first number so that a detection error can be reduced. The first setting module 173 increases the size of the first preset value C1 according to an increase of the first number.

In some examples, the size of the first preset value C1 may change with a traveling speed of the robotic lawn mower 100. When the traveling speed of the robotic lawn mower 100 is relatively high, an error between the detected first journey $\Delta S1$ and second journey $\Delta S2$ increases. Therefore, when the traveling speed of the robotic lawn mower 100 is increased, the first setting module 173 may increase the first preset value C1. When the body 10a of the robotic lawn mower 100 has a first traveling speed, the first preset value C1 is a first value, and when the body 10a of the robotic lawn mower 100 has a second traveling speed, the first preset value C1 is a second value. When the first traveling speed is higher than the second traveling speed, the first value is greater than the second value.

In other examples, the first preset value C1 may change with the first journey $\Delta S1$. A first preset value C1 when the first journey $\Delta S1$ of the robotic lawn mower 100 in the period T is a first value is greater than a first preset value C1 when the first journey $\Delta S1$ of the robotic lawn mower 100 in the period T is a second value, where the first value is greater than the second value.

Similarly, a size of the second preset value C2 may be adjusted or set. In this manner, the size of the second preset value C2 may be adjusted in real time according to the actual condition of the robotic lawn mower 100 and the working condition of the robotic lawn mower 100 in operation, thereby improving the detection accuracy of the actual distance of the robotic lawn mower 100. In this example, the robotic lawn mower 100 further includes a second setting module 174 configured to set the second preset value C2. The second setting module 174 is connected to the second failure determination module 172, and the second setting module 174 can set the size of the second preset value C2 in real time. In this example, when the difference between the first journey ΔS1 and the second journey ΔS2 is greater or equal to the second preset value C2 in each of the first number of consecutive periods T, the error of the actual distance corrected by the correction module 181 according to the first journey ΔS1 detected by the first detection module 161 continuously increases. In this case, the second setting module 174 changes the size of the second preset value C2 according to the change of the first number so that the detection error can be reduced. The second setting module 174 increases the size of the second preset value C2 according to the increase of the first number.

In some examples, the size of the second preset value C2 may change with the traveling speed of the robotic lawn mower 100. When the traveling speed of the robotic lawn mower 100 is relatively high, the error between the detected first journey ΔS1 and second journey ΔS2 increases. Therefore, when the traveling speed of the robotic lawn mower 100 is increased, the second setting module may increase the second preset value C2. When the body 10a of the robotic lawn mower 100 has the first traveling speed, the second preset value C2 is a first value, and when the body 10a of the robotic lawn mower 100 has the second traveling speed, the second preset value C2 is a second value. When the first traveling speed is higher than the second traveling speed, the first value is greater than the second value.

In other examples, the second preset value C2 may change with the first journey ΔS1. A second preset value C2 when the first journey ΔS1 of the robotic lawn mower 100 in the period T is the first value is greater than a second preset value C2 when the first journey ΔS1 of the robotic lawn mower 100 in the period T is the second value, where the first value is greater than the second value.

In this manner, the method for correcting the distance of the robotic lawn mower 100 further includes: setting the size of the first preset value C1 according to a change of the motion parameter of the robotic lawn mower 100. As described above, the motion parameter may be the traveling speed of the body 10a of the robotic lawn mower 100 or the first journey ΔS1 in the period T. Alternatively, the motion parameter may be the number of consecutive periods T in each of which the difference between the second first journey ΔS1 and the first journey ΔS2 is greater than or equal to the first preset value C1.

The robotic lawn mower 100 may further include the execution module 19 configured to execute a response program. When the difference between the second journey ΔS2 and the first journey ΔS1 is greater than or equal to the first preset value C1 in each of n1 consecutive periods T, the control module 182 controls the execution module 19 to execute the response program. That is, each of the n1 consecutive periods T satisfies the following formula:

$$\Delta S2 - \Delta S1 \geq C1. \qquad (5)$$

In an example, when the difference between the second journey ΔS2 and the first journey ΔS1 is greater than or equal to the first preset value C1 in each of the n1 consecutive periods T, the first failure determination module 171 determines that the robotic lawn mower 100 slips. In this example, the number of consecutive periods T is set each of which satisfies that the difference between the second journey ΔS2 and the first journey ΔS1 is greater than or equal to the first preset value C1. Thus, the determination accuracy of the first failure determination module 171 can be improved and a false positive rate can be reduced. In an actual traveling process, the robotic lawn mower 100 typically walks on the lawn. However, the lawn is generally not even enough, so the robotic lawn mower 100 easily satisfies that the difference between the second journey ΔS2 and the first journey ΔS1 is greater than or equal to the first preset value C1 in the relatively short period T. If the robotic lawn mower 100 is required to execute the response program in this case, it is very likely that the robotic lawn mower 100 executes the response program all the time or the robotic lawn mower 100 executes the response program as soon as the robotic lawn mower 100 is started, which affects the operation of the robotic lawn mower 100 and reduces working efficiency. In this example, the number of consecutive periods T is set each of which satisfies that the difference between the second journey ΔS2 and the first journey ΔS1 is greater than or equal to the first preset value C1. Thus, the robotic lawn mower 100 can be prevented from executing the response program when the robotic lawn mower 100 does not slip or in the case where a slip time is negligible, thereby improving the working efficiency. On the other hand, when the first failure determination module 171 determines that the robotic lawn mower 100 slips, the execution module 19 executes the response program, which can avoid the case where the robotic lawn mower 100 is in a slip state all the time and mowing efficiency is affected.

In this example, the execution module 19 may include an alarm module 191, and when the first failure determination module 171 determines that the robotic lawn mower 100 slips, the alarm module 191 can send an alarm signal to the user in time. The alarm signal may be a sound signal. In this manner, when the sound signal is sent by the alarm module 191, if the user is not near the robotic lawn mower 100 and is doing other things indoors, the user can hear, in time, the sound signal indicating a failure of the robotic lawn mower 100. Thus, the user can arrive in time to help the robotic lawn mower 100 out of a predicament, thereby improving the working efficiency of the robotic lawn mower 100. Alternatively, the alarm signal is an optical signal. In this manner, in a relatively dim environment or a relatively noisy environment, the user can discover the failure of the robotic lawn mower 100 in time, thereby helping the robotic lawn mower 100 out of the predicament in time. Alternatively, the alarm signal may be an alarm mark on a display screen of the robotic lawn mower 100 itself. Alternatively, the alarm module 191 may transmit the alarm signal directly to a mobile phone, a computer, or another device on the user side so that the user can more easily discover the failure of the robotic lawn mower 100.

In this example, the execution module 19 further includes a failure avoidance module 192. When the first failure determination module 171 determines that the robotic lawn mower 100 slips, the failure avoidance module 192 controls the robotic lawn mower 100 to perform an action response such that the robotic lawn mower 100 automatically gets out of the predicament. The action response may cause the robotic lawn mower 100 to stop, the action response may cause the robotic lawn mower 100 to move backward, the action response may cause the robotic lawn mower 100 to change a direction, the action response may cause the robotic lawn mower 100 to change the traveling speed, or the like. Finally, the robotic lawn mower 100 performs the action response so that the robotic lawn mower 100 no longer slips. The failure avoidance module 192 controls the robotic lawn mower 100 to perform the action response or the alarm module 191 sends the alarm signal, which is considered as that the execution module 19 has executed the response program.

During the slip of the robotic lawn mower 100, it is possible that the difference between the second journey $\Delta S2$ and the first journey $\Delta S1$ is less than the first preset value C1 in a certain period T. Therefore, the first failure determination module 171 can also determine whether the number of periods T in each of which the difference between the second journey $\Delta S2$ and the first journey $\Delta S1$ is greater than or equal to the first preset value C1 is greater than or equal to n2 in a consecutive plurality of periods T among n2 to n3. When the number of periods Tin each of which the difference between the second journey $\Delta S2$ and the first journey $\Delta S1$ is greater than or equal to the first preset value C1 is greater than or equal to n2 in the consecutive plurality of periods T among the n2 to n3, the control module 182 controls the execution module 19 to execute the response program. In this manner, a failure can be prevented from failing to be determined, thereby improving the accuracy rate of slip determination. In this example, n1 is less than n2 and n2 is less than n3 so that the failure is determined more reasonably. When the number of periods T satisfying the formula $\Delta S2 - \Delta S1 \geq C1$ is greater than or equal to n2 in the consecutive plurality of periods among the n2 to n3, it is considered that the robotic lawn mower 100 slips. If a ratio of the number of periods T satisfying that the difference between the second journey $\Delta S2$ is greater than or equal to the first preset value C1 in the consecutive plurality of periods T among the n2 to n3 to n3 is greater than or equal to a preset value, it is also considered that whether the number of periods T is greater than or equal to n2 in each of which the difference between the second journey $\Delta S2$ and the first journey $\Delta S1$ is greater than or equal to the first preset value C1 is determined indirectly.

The second failure determination module 172 can also determine whether the difference between the first journey $\Delta S1$ and the second journey $\Delta S2$ is greater than or equal to the second preset value C2. When the difference between the first journey $\Delta S1$ and the second journey $\Delta S2$ is greater than or equal to the second preset value C2 in each of k1 consecutive periods T, the control module 182 controls the execution module 19 to execute the response program. That is, each of the k1 consecutive periods T satisfies the following formula:

$$\Delta S1 - \Delta S2 \geq C2. \qquad (6)$$

When the difference between the first journey $\Delta S1$ and the second journey $\Delta S2$ is greater than or equal to the second preset value C2 in each of the k1 consecutive periods T, the second failure determination module 172 determines that the robotic lawn mower 100 skids or slides on a slope. In this example, the number of consecutive periods T is set each of which satisfies that the difference between the first journey $\Delta S1$ and the second journey $\Delta S2$ is greater than or equal to the second preset value C2. Thus, the determination accuracy of the second failure determination module 172 can be improved and the false positive rate can be reduced. In the actual traveling process, the robotic lawn mower 100 typically walks on the lawn. However, the lawn is generally not even enough, so the robotic lawn mower 100 easily satisfies that the difference between the first journey $\Delta S1$ and the second journey $\Delta S2$ is greater than or equal to the second preset value C2 in the relatively short period T. If the robotic lawn mower 100 is required to execute the response program in this case, it is very likely that the robotic lawn mower 100 executes the response program all the time or the robotic lawn mower 100 executes the response program as soon as the robotic lawn mower 100 is started, which affects the operation of the robotic lawn mower 100 and reduces the working efficiency. In this example, the number of consecutive periods T is set each of which satisfies that the difference between the first journey $\Delta S1$ and the second journey $\Delta S2$ is greater than or equal to the second preset value C2. Thus, the robotic lawn mower 100 can be prevented from executing the response program when the robotic lawn mower 100 does not skid or in the case where a skid time is negligible, thereby improving the working efficiency. On the other hand, when the second failure determination module 172 determines that the robotic lawn mower 100 skids or slides on a slope, the execution module 19 executes the response program, which can avoid the case where the robotic lawn mower 100 is in a skid or slide state all the time and the mowing efficiency is affected.

Similarly, when the second failure determination module 172 determines that the robotic lawn mower 100 skids or slides on a slope, the alarm module 191 may send the alarm signal, or the failure avoidance module 192 controls the robotic lawn mower 100 to perform the action response.

During the skid or slide of the robotic lawn mower 100 on a slope, it is possible that the difference between the first journey $\Delta S1$ and the second journey $\Delta S2$ is less than the second preset value C2 in a certain period T. Therefore, the second failure determination module 172 can also determine whether the number of periods T in each of which the difference between the first journey $\Delta S1$ and the second journey $\Delta S2$ is greater than or equal to the second preset value C2 in a consecutive plurality of periods among k2 to k3 is greater than or equal to k2. When the number of periods T in each of which the difference between the first journey $\Delta S1$ and the second journey $\Delta S2$ is greater than or equal to the second preset value C2 in the consecutive plurality of periods among the k2 to k3 is greater than or equal to k2, the control module 182 controls the execution module 19 to execute the response program. In this manner, a failure can be prevented from failing to be determined, thereby improving the accuracy rate of determination of the skid or slide on a slope. In this example, k1 is less than k2 and k2 is less than k3 so that the failure is determined more reasonably. When the number of periods T satisfying that the difference between the first journey $\Delta S1$ and the second journey $\Delta S2$ is greater than or equal to the second preset value C2 in the consecutive plurality of periods T among the k2 to k3 is greater than or equal to k2, it is considered that the robotic lawn mower 100 skids or slides on a slope. If a ratio of the number of periods T satisfying that the difference between the first journey $\Delta S1$ and the second journey $\Delta S2$ is greater than or equal to the second preset value C2 in the consecutive plurality of periods T among the k2 to k3 to k3 is greater than or equal to a preset value, it is also considered that whether the number of periods T is greater than or equal to k2 in each of which the difference between the first journey $\Delta S1$ and the second journey $\Delta S2$ is greater than or equal to the second preset value C2 is determined indirectly.

Figure 6:
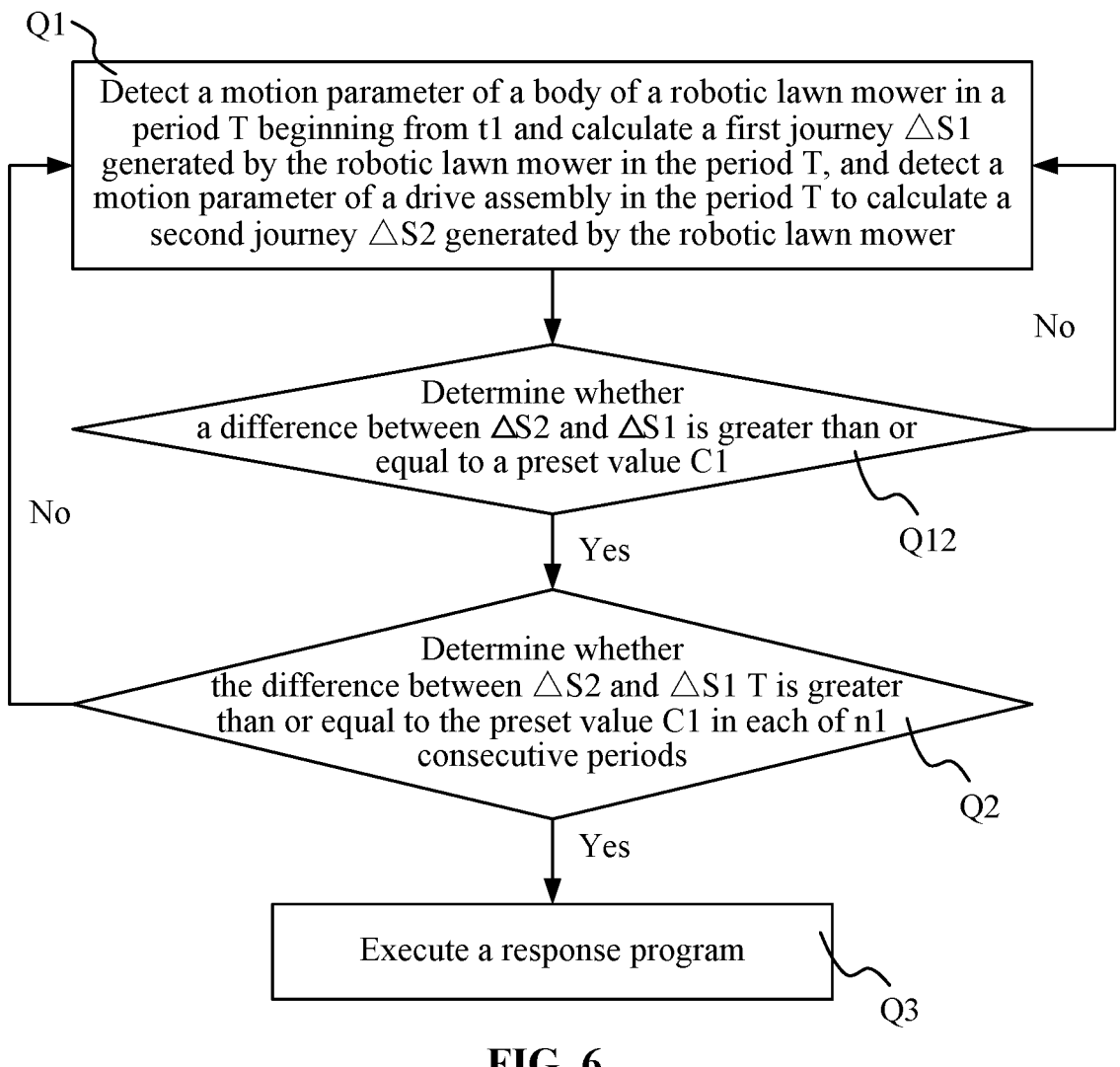
FIG. 6 is a flowchart of a method for determining a slip of the robotic lawn mower in FIG. 1.

As shown in FIG. 6, a control method of the robotic lawn mower 100 may be a method for determining whether the robotic lawn mower 100 slips and how to perform the response program, and the control method includes the steps described below.

In Q1, the motion parameter of the body 10a of the robotic lawn mower 100 in the period T is detected and the first journey ΔS1 of the robotic lawn mower 100 in the period is calculated, and the motion parameter of the drive assembly 15 in the period T is detected and the second journey ΔS2 of the robotic lawn mower 100 in the period is calculated.

In Q2, it is determined whether the difference between the second journey ΔS2 and the first journey ΔS1 is greater than or equal to the first preset value C1 in each of the n1 consecutive periods T. When the difference between the second journey ΔS2 and the first journey ΔS1 is greater than or equal to the first preset value C1 in each of the n1 consecutive periods T, the process goes to the next step. When not all of the n1 consecutive periods T satisfy that the difference between the second journey ΔS2 and the first journey ΔS1 is greater than or equal to the first preset value C1, the process returns to step Q1 to continue the detection.

In Q3, when the difference between the second journey and the first journey is greater than or equal to the first preset value in each of the n1 consecutive periods, the robotic lawn mower 100 is controlled to execute the response program.

As shown in FIG. 6, step Q12 may be further included between step Q1 and step Q2. For example, before it is determined whether the difference between the second journey ΔS2 and the first journey ΔS1 is greater than or equal to the first preset value C1 in each of the n1 consecutive periods T, it may be determined whether the difference between the second journey ΔS2 and the first journey ΔS1 is greater than or equal to the first preset value C1 in the period T. In this manner, when the period T does not satisfy that the difference between the second journey ΔS2 and the first journey ΔS1 is less than the first preset value C1, the process may directly return to step Q1 for detection in the next period T, thereby improving program operation efficiency.

As shown in FIG. 7, step Q21 may be further included between step Q2 and step Q3. For example, when not all of the n1 consecutive periods T satisfy that the difference between the second journey ΔS2 and the first journey ΔS1 is greater than or equal to the first preset value C1, it may be determined whether the number of periods T in each of which the difference between the second journey ΔS2 and the first journey ΔS1 is greater than or equal to the first preset value C1 in the consecutive plurality of periods among the n2 to n3 is greater than or equal to n2. If so, the process also goes to the next step Q3. If not, the process returns to step Q1. There is also no fixed sequence between step Q2 and step Q21. In other examples, step Q21 may be performed before step Q2.

Figure 8:
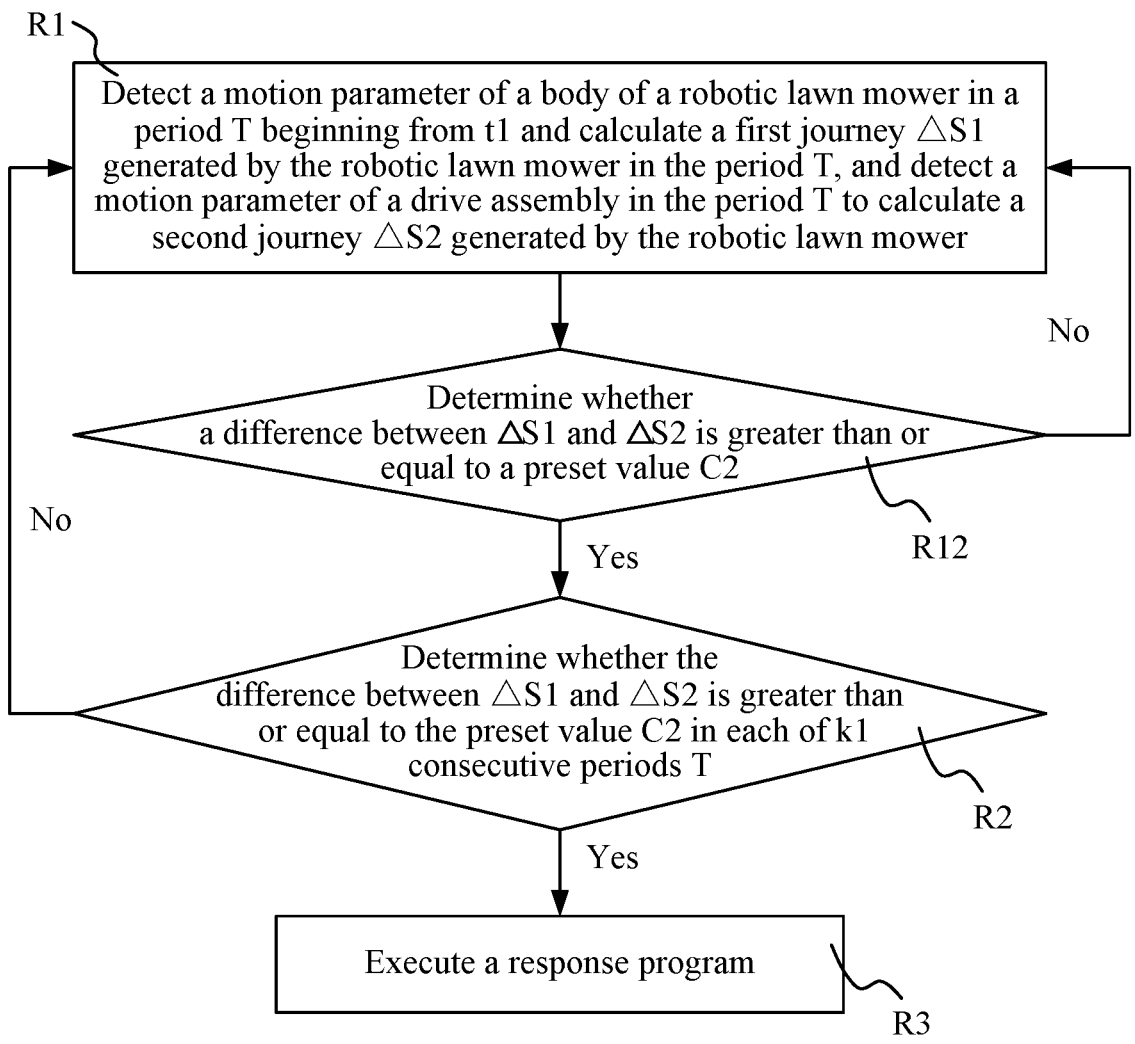
FIG. 8 is a flowchart of a method for determining a skid or a slide of the robotic lawn mower in FIG. 1 on a slope.

As shown in FIG. 8, another control method of the robotic lawn mower 100 may be a method for determining whether the robotic lawn mower 100 skids or slides on a slope and how to perform the response program, and the control method includes the steps described below.

In R1, the motion parameter of the body 10a of the robotic lawn mower 100 in the period T is detected and the first journey ΔS1 of the robotic lawn mower 100 in the period is calculated, and the motion parameter of the drive assembly 15 in the period T is detected and the second journey ΔS2 of the robotic lawn mower 100 in the period is calculated.

In R2, it is determined whether the difference between the first journey ΔS1 and the second journey ΔS2 is greater than or equal to the second preset value C2 in each of the k1 consecutive periods T. When the difference between the first journey ΔS1 and the second journey ΔS2 is greater than or equal to the second preset value C2 in each of the k1 consecutive periods T, the process goes to the next step. When not all of the k1 consecutive periods T satisfy that the difference between the first journey ΔS1 and the second journey ΔS2 is greater than or equal to the second preset value C2, the process returns to step R1 to continue the detection.

In R3, when the difference between the first journey ΔS1 and the second journey ΔS2 is greater than or equal to the second preset value C2 in each of the k1 consecutive periods T, the robotic lawn mower 100 is controlled to execute the response program.

As shown in FIG. 8, step R12 may be further included between step R1 and step R2. For example, before it is determined whether the difference between the first journey ΔS1 and the second journey ΔS2 is greater than or equal to the second preset value C2 in each of the k1 consecutive periods T, it may be determined whether the difference between the first journey ΔS1 and the second journey ΔS2 is greater than or equal to the second preset value C2 in the period T. In this manner, when the period T does not satisfy that the difference between the first journey ΔS1 and the second journey ΔS2 is less than the second preset value C2, the process may directly return to step R1 for detection in the next period, thereby improving the program operation efficiency.

Figure 9:
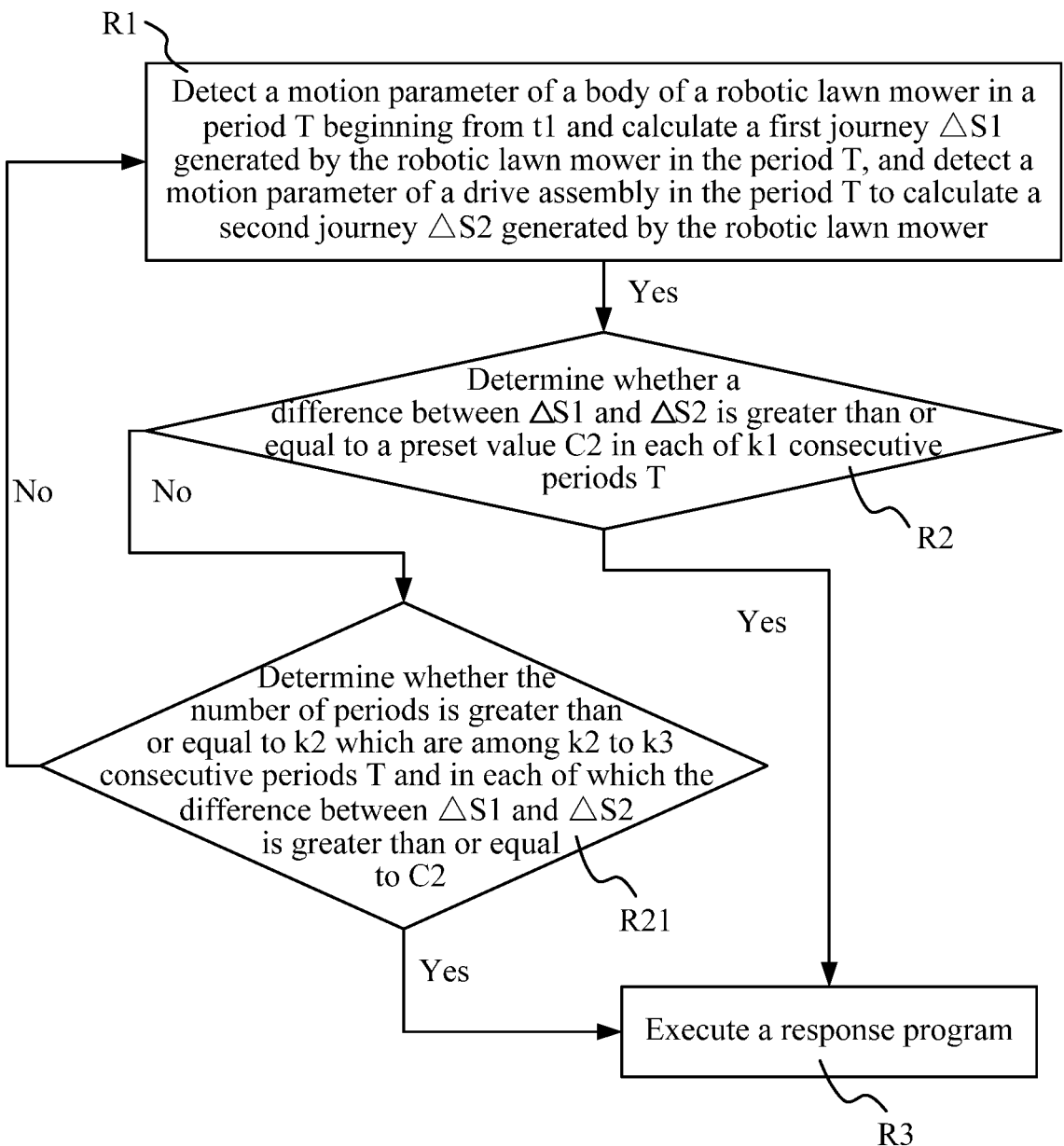
FIG. 9 is a flowchart of another method for determining a skid or a slide of the robotic lawn mower in FIG. 1 on a slope.

As shown in FIG. 9, step R21 may be further included between step R2 and step R3. For example, when not all of the k1 consecutive periods T satisfy that the difference between the first journey ΔS1 and the second journey ΔS2 is greater than or equal to the second preset value C2, it may be determined whether the number of periods T in each of which the difference between the first journey ΔS1 and the second journey ΔS2 is greater than or equal to the second preset value C2 in the consecutive plurality of periods T among the k2 to k3 is greater than or equal to k2. If so, the process also goes to the next step R3. If not, the process returns to step R1. There is also no fixed sequence between step R2 and step R21. In other examples, step R21 may be performed before step R2.

What is claimed is:

1. A robotic lawn mower, comprising:
   a mowing element;
   a body for supporting the mowing element;
   a drive assembly comprising walking wheels supporting the body to drive the body to walk on a ground and a motor connected to the walking wheels to drive the walking wheels to rotate;
   a first detection module detecting a motion parameter of the body of the robotic lawn mower in each of a first plurality of periods of measured time and calculating a first journey of the robotic lawn mower in each of the first plurality of predetermined periods of measured time;
   a second detection module detecting a motion parameter of the drive assembly in each of the first plurality of predetermined periods of measured time and calculating a second journey of the robotic lawn mower in each of the first plurality of predetermined periods of measured time;
   a failure determination module determining whether a difference between the second journey and the first journey is greater than or equal to a first preset value in each of the first plurality of predetermined periods of measured time;
   an execution module driving the robotic lawn mower to execute a response program; and
   a control module separately connected to the failure determination module and the execution module, wherein the control module controls the execution module to execute the response program only when the difference between the second journey and the first journey is greater than or equal to the first preset value in a second plurality of the first plurality of predetermined periods of measured time.

2. The robotic lawn mower according to claim 1, wherein the execution module comprises an alarm module configured to send an alarm signal to a user.

3. The robotic lawn mower according to claim 1, wherein the execution module comprises a failure avoidance module configured to control the robotic lawn mower to perform an action response.

4. The robotic lawn mower according to claim 1, further comprising a setting module connected to the failure determination module and configured to set a size of the first preset value.

5. The robotic lawn mower according to claim 1, wherein the each of the first plurality of predetermined periods of measured time is greater than or equal to 1 millisecond and less than or equal to 100 milliseconds.

6. A robotic lawn mower, comprising:
a mowing element;
a body for supporting the mowing element;
a drive assembly comprising walking wheels supporting the body to drive the body to walk on the ground and a motor connected to the walking wheels to drive the walking wheels to rotate;
a first detection module detecting a motion parameter of the body of the robotic lawn mower in each of a first plurality of predetermined periods of measured time and calculating a first journey of the robotic lawn mower in each of the first plurality of predetermined periods of measured time;
a second detection module detecting a motion parameter of the drive assembly in each of the first plurality of predetermined periods of measured time and calculating a second journey of the robotic lawn mower in each of the first plurality of predetermined periods of measured time;
a failure determination module determining whether a difference between the second journey and the first journey is greater than or equal to a preset value first plurality of predetermined periods of measured time;
an execution module driving the robotic lawn mower to execute a response program; and
a control module separately connected to the failure determination module and the execution module;
wherein the control module controls the execution module to execute the response program only when the difference between the second journey and the first journey is greater than or equal to the first preset value in a second, consecutive plurality of the first plurality of predetermined periods of measured time.

7. The robotic lawn mower according to claim 6, wherein the each of the first plurality of predetermined periods of measured time is greater than or equal to 1 millisecond and less than or equal to 100 milliseconds.

8. The robotic lawn mower according to claim 6, wherein the execution module comprises an alarm module configured to send an alarm signal to a user.

9. The robotic lawn mower according to claim 6, wherein the execution module comprises a failure avoidance module configured to control the robotic lawn mower to perform an action response.

10. The robotic lawn mower according to claim 6, further comprising a setting module connected to the failure determination module and configured to set a size of the first preset value.

* * * * *